United States Patent

Sandhu et al.

[11] 4,113,493
[45] Sep. 12, 1978

[54] AMORPHOUS POLYESTER ADHESIVES FOR PHOTOGRAPHIC MATERIALS

[75] Inventors: Mohammad Akram Sandhu, Webster; Kenneth Lloyd Tingler, Rochester, both of N.Y.

[73] Assignee: Eastman Kodak Company, Rochester, N.Y.

[21] Appl. No.: 778,635

[22] Filed: Mar. 17, 1977

[51] Int. Cl.$^2$ ................................................ G03C 1/76
[52] U.S. Cl. .................................... 96/67; 96/86 R; 96/68
[58] Field of Search ............... 96/114, 87 R, 85, 86 R, 96/67, 68; 260/75

[56] References Cited

U.S. PATENT DOCUMENTS 3,434,840  3/1969  DeKeyser et al. ................. 96/87 R Primary Examiner—John D. Welsh
Attorney, Agent, or Firm—Arthur H. Rosenstein

[57] ABSTRACT

Disclosed herein are heat-activatable adhesive compositions comprising an amorphous condensation polymer which is characterized by having an acid component comprising a phthalic acid derivative and a glycol component comprising from about 15 to about 85 mole percent of (1) a linear aliphatic glycol having the structure HO—R—H wherein R is either:

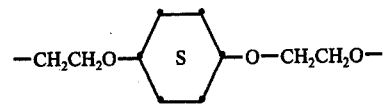

or $-(CH_2CH_2O)-_n$ wherein $n$ is an integer from 2 to 4; and from about 85 to about 15 mole percent of (2) a branched aliphatic glycol having the structure:

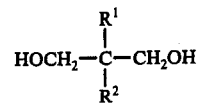

wherein $R^1$ and $R^2$ are alkyl. These polyester adhesives are further characterized as being soluble in halogenated solvents, having glass transition temperatures within the range of about −30° to about 50° C, and having high bonding strengths at elevated temperatures. They have been found useful in a variety of photographic materials, and particulary in photographic film units.

36 Claims, No Drawings

AMORPHOUS POLYESTER ADHESIVES FOR PHOTOGRAPHIC MATERIALS

BACKGROUND OF THE INVENTION

1. Field of the Invention

This invention relates to polymeric adhesive compositions and their use in radiation-sensitive elements and particularly photographic elements and processes to obtain a desirable combination of properties. In particular, this invention relates to heat-activatable, amorphous, organic solvent-soluble adhesive compositions capable of binding hydrophilic surfaces to hydrophobic surfaces in photographic materials. A preferred embodiment of this invention is the use of these adhesive compositions in photographic film units.

2. Description of the Prior Art

It is well-known that certain condensation polymers are useful as adhesives. For instance, U.S. Pat. No. 3,694,212 of Richter et al issued Sept. 26, 1972, discloses an adhesive for photographic materials comprising a reaction product of glycerin with an aliphatic dicarboxylic acid. U.S. Pat. No. 3,313,676 of Kamal et al issued Apr. 11, 1967, relates to laminate crosslinkable adhesives having unsaturated dicarboxylic acid moieties. U.S. Pat. No. 3,629,360 of Burkhart et al issued Dec. 21, 1971, relates to phenol-modified coumarone-indene resin blended with copolyesters in an adhesive mixture. German Pat. No. 1568-342 (Chemical Abstract 53885 V. 30) relates to adhesives made from polyesters containing carbonate groups. U.S. Pat. No. 3,013,914 of Willard issued Dec. 19, 1961, discloses polyesters made from at least two diacids and two diols which are useful as hot melt adhesives for metal-can seams. Adhesives for splicing motion-picture film are disclosed in U.S. Pat. No. 3,117,901 of Chamber issued Jan. 14, 1964. Polyester adhesives for leather goods are described in U.S. Pat. Nos. 3,136,677 of Woker issued June 9, 1964, and 3,505,293 of Bond et al issued Apr. 7, 1970. U.S. Pat. No. 3,652,502 of Jackson et al issued Mar. 18, 1972, relates to crystalline polyester adhesives which have free carboxyl groups useful in metal and electrical products. U.S. Pat. No. 1,852,375 of Biethau et al issued Dec. 3, 1924, relates to polyesters plasticized with aminoplasts useful in varnishes and enamels.

It is also well-known to use polyester adhesives in laminates, as disclosed in U.S. Pat. No. 3,054,703 of Brasure issued Sept. 18, 1962. These adhesives are polyesters of a terephthalic acid with a branced alkyl glycol to bond polyethylene terephthalate to various materials. This reference, however, fails to teach or suggest the use of a polyester adhesive which has a glycol component comprising any di-, tri- or tetraethylene glycol or 1,4-bis(2-hydroxyethoxy)cyclohexane. An adhesive made with only a branched aliphatic glycol and without a linear aliphatic glycol has undesirably low bonding strengths. U.S. Pat. No. 3,372,148 of Wiener issued Mar. 5, 1963, describes amorphous polyester adhesives made from ethylene glycol, dimethyl hexahydroterephthalate and dimethyl terephthalate used in fibrous sheet materials. These adhesives crystallize upon application of heat.

U.S. Pat. No. 3,515,628 of Jackson et al issued June 2, 1970, relates to hot melt adhesives for metal-can seams and resins having a glass transition temperature below 30° C. and a crystallinity within the range of 5 to 25%. These polyesters are made from a phthalic acid and any alkylene glycol. The reference teaches that most polyesters with less than 5% crystallinity have undesirably low adhesive strengths at temperatures above 50° C. The polyesters described in this patent, however, have not been found to be useful in the formation of photographic film units as they exhibit low peel strength at higher temperatures.

U.S. Pat. No. 3,036,913 of Burg issued May 29, 1962, relates to the use of polyester subbing layers to bond photopolymerizable layers to supports in photopolymerizable elements. These adhesives comprise thermally sensitive addition polymerization catalysts which are light-activated.

In U.S. Pat. No. 3,658,541 of Jacoby et al issued Apr. 25, 1972, are described polyester adhesive subbing layers having an adhesive comprising ethylene glycol as the glycol component, which is used to render gelatinous compositions adherent to polyester supports in photographic elements. The polyesters are modified with an acid modifying agent and an organic dianhydride to render them soluble in organic solvents such as methylene chloride.

Various formats for photographic film units are described in U.S. Pat. Nos. 2,352,014 of Rott issued June 20, 1944, 2,543,181 of Land issued Feb. 27, 1951, 2,983,606 of Rogers issued May 9, 1961, 3,020,155 of Yackel et al issued Feb. 6, 1962, 3,227,550 of Whitmore et al issued Jan. 4, 1966, 3,227,552 of Whitmore issued Jan. 4, 1966, 3,415,644, 3,415,645 and 3,415,646, all of Land and issued Dec. 10, 1968, 3,635,707 of Cole issued Jan. 18, 1972, 3,362,819 and 3,362,821, both of Land and issued Jan. 9, 1968, 3,647,437 of Land issued Mar. 7, 1972, and 3,756,815 of Schlein et al issued Sept. 4, 1973, Canadian Pat. Nos. 674,082 of Whitmore issued Nov. 12, 1963, and 928,559 of Cole issued June 19, 1973, Belgian Pat. Nos. 757,959 and 757,960, British Pat. Nos. 904,364 and 840,731, and copending U.S. Application Ser. No. 676,945 of Hannie filed Apr. 14, 1976. None of these references teaches or suggests the adhesive compositions disclosed herein or their use in photographic materials.

In these formats, the image-receiving layer containing the photographic image for viewing can be separated from the photographic layers after processing or, in some embodiments, it can remain permanently attached and integral with the image-generating and ancillary layers present in the structure when a transparent support is employed on the viewing side of the assemblage. The image is formed by color-providing substances released from the image-generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the color-providing materials which are formed or released in the respective image-generating layers begin to diffuse throughout the structure. At least a portion of the imagewise-distributed or release color-providing substances migrates to the dye image-receiving layer to form an image of the original subject.

Typically, adhesives are used in photographic film units to bond supports, subbed or unsubbed, to cover sheets or other layers around the edges of the units. Adhesives can also be used to bond subbing layers to supports or cover sheets, photosensitive layers to image-receiving layers, and the like. It has been also desirable to provide high-strength adhesives for bonding spacer rail substrates to other layers, such as barrier timing layers, supports, photosensitive layers and the like. These spacer rail substrates generally separate the photosensitive element of the film unit from a cover sheet which contains the barrier timing layer. However, due to many prerequisites for acceptable bonding at low and moderate temperatures of spacer rail substrates to other layers, none of the prior-art adhesives is useful in these photographic materials.

Most polyester adhesives taught in the art exhibit extremely low bonding strengths at moderate to high temperatures, such as within the range of 40° C. to 90° C. Hence, they must be used at low temperatures, undesirably limiting manufacturing and processing conditions. Further these prior-art adhesives do not satisfactorily bond all types of materials. For instance, some can be used only to bond hydrophilic surfaces, and others adhere only to hydrophobic surfaces. Still further, most adhesives known in the art are crystalline in nature or are not conducive to heat-sealing or dielectric sealing techniques.

It is evident, then, that there is a need in the photographic arts for amorphous adhesives which are heat-activatable and which have high bonding strengths over a wide range of temperatures.

SUMMARY OF THE INVENTION

It has been unexpectedly found, according to the present invention, that certain amorphous, organic solvent-soluble condensation polymers are useful in adhesive compositions for radiation-sensitive materials and particularly for photographic film units. These polymers have high bonding strengths at moderate to high temperatures and can be used to bond hydrophilic surfaces to hydrophobic surfaces.

One aspect of the present invention is an adhesive composition comprising an amorphous polyester comprising an acid component comprising at least one phthalic acid derivative, and a glycol component comprising (1) from about 15 to about 85 mole percent of at least one linear aliphatic glycol having the structure HO-R-H where R is selected from the group consisting of:

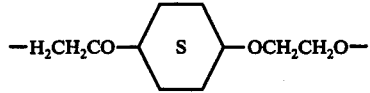

and $(CH_2CH_2O)_n$ wherein $n$ is an integer of from 2 to 4, and (2) from about 85 to about 15 mole percent of at least one branched aliphatic glycol having the structure:

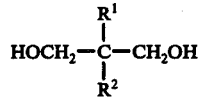

wherein $R^1$ and $R^2$ are alkyl; wherein the polyester is less than 1% crystalline, is capable of remaining amorphous at temperatures above about 20° C., is soluble in halogenated solvents, and has a glass transition temperature within the range of from about −30° to about +50° C.

In another apsect of the present invention, an improved radiation-sensitive element comprises a support having thereon at least one radiation-sensitive layer and an amorphous polyester adhesive as described hereinabove.

Still another aspect of the present invention comprises an improved photographic film unit comprising a photosensitive element comprising a support having thereon at least one photosensitive silver halide emulsion layer having associated therewith a dye image-providing material, a dye image-receiving layer, means for discharging an alkaline processing composition within the film unit in contact with the photosensitive layer, a neutralizing layer for neutralizing the alkaline processing composition, and a barrier timing layer which is permeable by the alkaline processing composition after a predetermined time located between the neutralizing layer and the photosensitive silver halide emulsion, the film unit containing a silver halide developing agent and the amorphous adhesive composition described hereinabove.

A further aspect of the present invention comprises a dye image-receiving element comprising a support having thereon a neutralizing layer, a barrier timing layer, a dye image-receiving layer and the amorphous adhesive composition described hereinabove.

Another aspect of the present invention comprises a cover sheet for use with a color diffusion transfer assemblage comprising a transparent support having thereon a neutralizing layer, a barrier timing layer and the amorphous adhesive composition described hereinabove.

DETAILED DESCRIPTION OF THE INVENTION

Generally, the amorphous polyesters useful in the present invention are copolyesters formed by condensing a glycol component of at least two polyhydric alcohols with an acid component of at least one phthalic acid derivative containing at least two condensation sites. It is noted that amide groups can be used as linking groups rather than ester groups. This modification is readily achieved by condensing in the presence of amino alcohols, diamines or amino acids. The phthalic acids can be condensed in the form of a free acid or in the form of a functional derivative, such as an anhydride, a lower alkyl ester or an acid halide.

The glycol component used in making the copolyesters described herein comprises from about 15 to about 85 mole percent of linear aliphatic glycol having the structure HO—R—H wherein R is selected from the group consisting of:

and $(CH_2CH_2O)_n$ wherein $n$ is an integer of from 2 to 4. Exemplary glycols of these include diethylene glycol, triethylene glycol, tetraethylene glycol, 1,3-bis(2-hydroxyethoxy)cyclohexane, 1,4-bis(2-hydroxyethoxy)cyclohexane and the like. The glycol component also comprises from about 85 to about 15 mole percent of a branched aliphatic glycol having the structure:

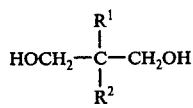

wherein $R^1$ and $R^2$ are alkyl, preferably having from 1 to 4 carbon atoms. Exemplary glycols include neopentyl glycol, 2,2-diethyltrimethylene glycol, 2,2-dipropyltrimethylene glycol, 2,2-dibutyltrimethylene glycol, 2-methyl-2-ethyltrimethylene glycol, 2-ethyl-2-propyltrimethylene glycol and the like. The glycol component can be a mixture of several glycols from both groups of glycols described hereinabove. The corresponding diamines can, if desired, be substituted for the diols in forming condensation copolymers useful in the present invention.

The acid component of the amorphous copolyesters described herein comprises one or more phthalic acid derivatives, such as hexahydroterephthalic acid, hexahydroisophthalic acid, isophthalic acid, terephthalic acid, 2,5-dichloroterephthalic acid, dimethyl 5-sodiosulfoisophthalic acid and the like, and corresponding derivatives, such as dianhydrides, diacid chlorides and di(lower alkyl) esters, preferably having from 1 to 6 carbon atoms, such as methyl, ethyl, propyl, butyl, isopropyl, and the like.

Copolyesters preferred in the practice of this invention include poly[oxydiethylene-co-2,2-dimethyl-1,3-propylene (50:50) terephthalate], poly[2-butyl-2-ethyl-1,3-propylene-co-oxydiethylene (40:60) terephthalate], poly[ethylenebis(oxyethylene)-co-2,2-dimethyl-1,3-propylene (40:60) terephthalate], poly[oxydiethylene-do-2,2-dimethyl-1,3-propylene (50:50) pyromellitate-co-terephthalate (5:95)] and poly[oxydiethylene-co-2,2-dimethyl-1,3-propylene (50:50) hexahydroterephthalate]. The first mentioned copolyester is most preferred.

In a preferred embodiment, the acid component of the polyesters described herein comprises a phthalic acid derivative selected from the group consisting of terephthalic acid, isophthalic acid and hexahydroterephthalic acid, and the glycol component comprises (1) from about 15 to about 85 mole percent of at least one linear aliphatic glycol having the structure HO—R—H wherein R is as described hereinabove and (2) from about 85 to about 15 mole percent of at least one branched aliphatic glycol having the structure:

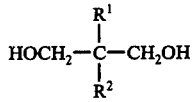

wherein $R^1$ and $R^2$ are as described hereinabove.

In a more preferred embodiment, the polyesters comprise from about 40 to about 60 mole percent of glycol (1) and from about 60 to about 40 mole percent of glycol, (2).

Other polyhydric glycols and diacids or their functional derivatives such as are known in the art may be used in conjunction with the above components in making the polyesters useful in this invention, depending upon the properties of the resulting polyesters desired. Examples of these are glycols, such as glycerol, pentaerythritol and the like, and acids, such as pyromellitic dianhydride, 3,4':3',4'-benzophenonetetracarboxylic anhydride and the like. The compounds and their amounts described hereinabove are preferred, however, to provide desired bonding strengths and properties, particularly at elevated temperatures.

The condensation polyesters described herein can be prepared by procedures well-known in the art for making linear condensation polymers, particularly interfacial, solution or ester interchange procedures, the last being preferred. Reaction times are a function of all other variables and, as such, are governed by the inherent viscosity desired and the resulting polymer.

When employing interfacial procedures, polymerization is carried out in suitable halogenated solvents, such as methylene chloride, chloroform, dichloroethane, propylene dichloride and the like. Reaction temperatures are governed by maintenance of a practical rate of reaction and the boiling point of the solvent with a range of 10° to 40° C. being suitable.

Solution polymerization procedures can be carried out by condensing suitable acid halides, such as chlorides, of the dicarboxylates to be incorporated with the desired diols in a suitable solvent, such as terephthaloyl-, isophthaloyl- and hexahydrocyclohexanedicarbonyl chlorides and the like, in the presence of a suitable acid acceptor such as pyridine, triethyl amine, tripropyl amine and the like. The acid acceptor can be employed in excess to serve as the solvent.

The preferred mode of preparing the polyesters disclosed herein is the ester interchange procedure either by melt or powder process, and preferably by the melt process. The diols of the glycol component and the carboxylates of the acid component are heated to a melt on an approximately equal molar basis and treated with a transesterification catalyst such as an alkali or alkaline earth metal carbonate, oxide, hydroxide, hydride or alkoxide, or a compound of a Group IVB metal of the periodic table, such as tetraisopropyl orthotitanate, butyl titanate, organometallic halides, and complex alkoxides such as $NaHTi(OC_4H_9)_2$, and the like. As a practical matter, it is frequently desirable to utilize an excess of up to about 10 molar percent of the glycol component in the reaction mixture. Low-boiling alcohols are removed by distillation during polymerization. When the polymerization is completed, the viscous solution can be cooled to obtain the resulting polyester.

Typically, it is desirable that the condensation copolymers described herein exhibit an inherent viscosity of from about 0.25 to about 1.25, and preferably from 0.40 to 0.80, as measured at 25° C. at a concentration of 0.25 g. per deciliter in a 1:1 mixture of phenol and chlorobenzene. As used herein, the term "inherent viscosity" is determined by the formula:

$$\{\eta\} = \frac{2.30 \log \eta_r}{C}$$

wherein $\{\eta\}$ is the inherent viscosity; $\eta\nu$ is the relative viscosity, i.e., the viscosity of a phenol:chlorobenzene solution of the polymer divided by the viscosity of the phenol:chlorobenzene solvent mixture in the same units; and C is the concentration in grams of polymer per 100 cc. of solution.

Also typically, it is desirable that the polymers described herein have a glass transition temperature within the range of about $-30°$ C. to about 50° C. Generally, this range provides exceptional bonding strengths in adhesive compositions at sealing temperatures above 90° C., and preferably between about 90° C. and about 150° C. The glass transition temperatures (Tg), as used herein, unless otherwise specified, can be determined by differential scanning colorimetry as disclosed in *Techniques and Methods of Polymer Evaluation, Vol.* 2, Marcel Dekker, Inc., N.Y., 1970.

The polyesters disclosed herein are amorphous, meaning that they are less than 1% crystalline as determined by X-ray diffraction analysis. When subjected to X-rays, a crystalline material exhibits a coherent scattering due to its crystalline order and has many sharp maximum peaks. The noncrystalline or amorphous materials useful in the present invention, however, exhibit incoherent X-ray scattering and have a broad band with few or no peaks. The copolyesters of this invention maintain their amorphous nature, especially at temperatures above about 20° C., unlike the polyesters of the prior art, such as those described in U.S. Pat. No. 3,515,628 of Jackson, Jr., et al. It is essential that the polyesters remain amorphous at high temperatures in order to have adequate bonding strengths for the purposes contemplated by this invention. Further, these polyesters are advantageously soluble in halogenated solvents, particularly chlorinated solvents, such as methylene chloride, ethylene dichloride, chlorobenzene, chloroform, trichloroethylene, methyl chloroform and the like. Some are also soluble in water and in other organic solvents such as dioxane, tetrahydrofuran, toluene and xylene. Solubility in the chlorinated solvents is defined as soluble at least up to 25 percent by weight of the polymer while leaving the solution clear and free from particulates or gel particles.

The adhesive compositions of this invention can be modified with various materials to result in compositions which exhibit additional useful properties or decrease their cost. These materials, which comprise plasticizers, mineral fillers, pigments, antioxidants, UV absorbers and resin extenders, are not critical to the present invention but are regularly used in the adhesive art to tailor the composition to a specific need.

The use of plasticizers in the compositions of the present invention can be desirable and will often enhance the machinability of the product by adjusting its viscosity at those temperatures at which the adhesive compositions are applied to a substrate. Exemplary plasticizers which are used in the art and which can be suitably utilized in the compositions of the present invention are petrolatum, mineral oil, chlorinated paraffins, diisobutyl phthalate, tricresyl phosphate, dioctyl phthalate, propylene glycol dibenzoate, chlorinated aromatic compounds, lower aliphatic esters of adipic acid, lower aliphatic esters of sebacic acid and the like. The amount of plasticizer which can be used in the adhesive compositions can range up to about 20 percent by weight of the total composition.

Mineral fillers are commonly used in adhesive compositions as extenders to improve the economics of the formulation and often impart creep resistance to it. When used, these fillers can comprise up to about 30 percent by weight of the total formulation. Fillers which can be used in the compositions of this invention are exemplified by calcium carbonate, barium sulfate, silica, talc, china clay and bentonite.

Antioxidants and UV absorbers can be incorporated into the adhesive compositions of this invention to improve their aging characteristics. Useful antioxidants and UV absorbers are butylated hydroxytoluene, butylated hydroxyanisole, diphenolic hindered antioxidants and the like, such as 4,4-methylene-bis(2,6-di-t-butylphenol) and tris(di-t-butyl-p-hydroxybenzyl)trimethylbenzene. Ordinarily, about 0.05 to about 1.0 percent by weight of antioxidant or UV absorber, based on total adhesive composition weight, is sufficient.

The adhesive compositions of this invention can also be modified or extended with polymeric materials, other than those required as essential ingredients, having a softening point (ring and ball method) of from about 90° to about 170° C. and having a melt index of from about 2 to about 300. These materials can be hydrocarbon resins such as are commonly prepared from a dripolene stream, atactic polypropylene and polyethylene or resins such as rosin derivatives, terpene resins including α- and β-pinene resins and the like. The use of such extending resins is common practice in the adhesive art, especially for the purpose of lowering formulation costs or modifying the formulation to fit specific needs.

Antiblocking agents commonly used in adhesives are waxes, including stearates, amides, microcrystalline and natural waxes such as carnauba wax, and the like.

The adhesive compositions described herein are formulated by any convenient method of mixing whereby the copolyesters and any desired addenda are mixed at a temperature within the range of from about 50° to about 100° C. in a suitable solvent (depending upon the boiling point), such as chlorinated solvents including trichloroethane, methylene chloride, ethylene dichloride and the like, at about from 10 to about 30 percent solids.

The adhesive compositions of the present invention can be used in a variety of radiation-sensitive elements, including lithographic, electrophotographic, electrographic materials and particularly photographic materials. They can be used to bond subbing layers to supports or to radiation-sensitive layers, or as subbing layers, or to splice unexposed or exposed film. Generally, they are useful to bond any layer to another, but particularly polymeric layers to other polymeric layers or to paper.

Preferably, the adhesives are used in photographic elements such as radiographic elements, direct-positive elements, negative image-forming elements, thermally processable elements, multilayer multicolor elements, high-contrast elements and the like. The resulting photographic elements are panchromatic or orthochromatic. Other typical elements and suitable photographic silver halide emulsions are disclosed in *Product Licensing Index,* Vol. 92, December, 1971, publication 9232, pp. 107–110, hereby incorporated by reference.

Suitable silver halide emulsions are disclosed in paragraphs I and II of *Product Licensing Index,* cited above. The silver halide emulsions can contain various addenda and vehicles as disclosed in paragraphs III–VIII and XI–XVI. They may be coated on various supports as described in paragraph X. The photographic layer or layers can be present in combination with one or more conventional subbing layers, interlayers, overcoats and the like.

The photographic elements of the present invention can be prepared and processed by any convenient conventional technique. Illustrative preparation techniques are disclosed in *Product Licensing Index,* cited above, paragraphs XVII and XVIII, and exemplary processing techniques are disclosed in paragraph XXIII.

Depending upon the particular layers bonded together and the bonding strengths desired, typical coating concentrations of the described adhesive compositions can be within the range of from about 8 to about 24 g./m.$^2$ of substrate.

In a preferred embodiment of the present invention, the described adhesives are used in photographic film units wherever there is a need to bond two layers, such as subbed, or unsubbed supports to cover sheets, subbing layers to supports or cover sheets, photosensitive layers to image-receiving layers, cover sheets or barrier timing layers, and the like. Preferably, the adhesive compositions are useful to bond barrier timing layers, such as those disclosed in U.S. Application Ser. Nos. 676,945 of Hannie and 676,947 of Hannie et al, both filed Apr. 14, 1976 now U.S. Pat. Nos. 4,056,394 and 4,061,496, respectively; to other layers, such as spacer rail substrates made of paper, polymers or other materials; and to bond spacer rail substrates to various layers of the photosensitive element.

The adhesives are also useful to close the entire film unit, i.e., to bond the subbed or unsubbed support to a cover sheet during manufacture of the film unit, as described in U.S. Application Ser. No. 676,945 of Hannie noted hereinabove. The adhesives are also useful when bonding hydrophilic subbing layers to hydrophobic layers such as film support surfaces including subbed and unsubbed poly(ethylene terephthalate), cellulosic polymers and the like. However, the adhesives disclosed herein also bond strongly to metal such as aluminum, steel, lead, tin, copper, iron and the like, glass, ceramics, wood, and other plastics known to those skilled in the photographic arts.

Still another use for the polyester adhesives disclosed herein is to reseal edges of image-transfer units after dispensation of the processing composition within the unit and separation of the unit from the means adapted to discharge the processing solution.

The adhesive compositions disclosed herein can be coated in a film on one or both layers or materials to be bonded in a concentration range of from about 8 g. to about 24 g./m.$^2$ of support. Alternatively, the compositions may be applied as a melt at temperatures ranging from 125° to 260° C. The adhesives can be coated as a solution of from about 80 to about 140 g. adhesive per liter of solution at from about 35 to about 65 mil wet thickness and dried for from about 0.5 to about 1.5 minutes at from about 40° to about 100° C. The resulting adhesive coating can then be sealed to various substrates at a temperature of from about 65° to about 140° C. and a pressure of from about 100 to about 1500 mmHg.

In addition to the adhesives described herein, a typical photographic film unit of the present invention comprises the following components:
  (a) a photosensitive element comprising a support having thereon at least one photosensitive silver halide emulsion layer having associated therewith a dye image-providing material;
  (b) a dye image-receiving layer;
  (c) means for discharging an alkaline processing composition within the film unit in contact with the photosensitive layer;
  (d) a neutralizing layer for neutralizing the alkaline processing composition; and p1 (e) a barrier timing layer which is permeable by the alkaline processing composition after a predetermined time located between the neutralizing layer and the photosensitive silver halide emulsion.

In one embodiment according to this invention, the film units are integral receiver color diffusion transfer film units in which adhesives of the invention can be employed between a cover sheet, as disclosed in Canadian Pat. No. 928,559, and the photosensitive element. In this embodiment, the support for the photosensitive element is transparent and is coated with the image-receiving layer, an opaque light-reflective layer, a black opaque layer and photosensitive layers having associated therewith dye image-providing materials. A rupturable container containing an alkaline processing composition and an opacifier such as carbon black is positioned adjacent the top layer and a transparent cover sheet. The cover sheet comprises a transparent support which is coated with a neutralizing layer and a barrier timing layer. The adhesive composition of this invention is used to bond the barrier timing layer to a spacer rail substrate which separates the barrier timing layer from the photosensitive layers. The film unit is placed in a camera, exposed through the transparent cover sheet and then passed through a pair of pressure-applying members in the camera as it is being removed therefrom. The pressure-applying members rupture the container and spread processing composition and opacifier over the image-forming portion of the film unit. The silver halide layers are developed and dye images are formed as a function of development. The dyes diffuse to the image-receiving layer to provide an image which is viewed through the transparent support on the opaque reflecting layer background. The barrier timing layer or layers break down after a period of time and make available materials to neutralize the alkaline processing composition and to shut down further silver halide development. For further details concerning the format of this particular integral film unit, reference is made to the above-mentioned Canadian Pat. No. 928,559, which is incorporated herein by reference.

Another embodiment of an integral color diffusion transfer film unit in which the adhesives of the invention can be employed in a dye image-receiving element is described in U.S Pat. No. 3,415,644 of Land. In this embodiment, the photosensitive element comprises an opaque support which is coated with photosensitive layers having associated therewith dye image-providing material layers. A rupturable container containing an alkaline processing, $TiO_2$ and an indicator dye (see U.S. Pat. No. 3,647,437) is positioned adjacent the top layer and a transparent receiver. The receiver comprises a transparent support which is coated with a neutralizing layer, a barrier timing layer and an image-receiving layer. The film unit is placed in a camera, exposed through the transparent receiver and then passed through a pair of pressure-applying members in the camera as it is being removed therefrom. The pressure-applying members rupture the container and spread processing composition, $TiO_2$ and indicator dye over the image-forming portion of the film unit to protect it from exposure. The processing composition develops each silver halide layer and an imagewise distribution of diffusible dye remains in areas which are not developed, and said dye diffuses to the image-receiving layer where it can be viewed through the transparent support on a white background, the indicator dye having "shifted" to a colorless form as the alkali is consumed by the neutralizing layer. As before, the neutralizing layer then neutralizes the alkaline processing composition after the barrier timing layer breaks down. For further details concerning the format of this particular film unit, reference is made to U.S. Pat. No. 3,415,644, which is incorporated herein by reference.

Another embodiment of a color diffusion transfer system in which the adhesives of this invention can be employed in a dye image-receiving element is described in U.S. Pat. No. 3,362,819 of Land et al. The image-receiving element comprises a support, which can be opaque, having thereon a neutralizing layer, a barrier timing layer and a dye image-receiving layer. For further details concerning the use of such an element in color-transfer film units, reference is made to the above-mentioned U.S. Pat. No. 3,362,819, which is incorporated herein by reference.

Still other useful integral formats in which this invention can be employed are described in U.S. Pat. Nos. 3,415,645, 3,415,646, 3,647,437, 3,635,707 and 3,594,165 and British Pat. No. 1,330,524.

The timing layer of the photographic film unit serves to delay the release of acid from the neutralizing layer for a predetermined period. The timing layer may be an inert layer, in which case the delay results principally from the time required for the alkali to pass physically through the layer. Inert timing layers, even when very thick, provide only a short delay. Examples of inert timing layers are layers of gelatine, poly(vinyl alcohol), carboxymethylcellulose, polyacrylamide, poly(vinylidene chloride), polystyrene and the like. Alternatively, the timing layer may be a barrier timing layer, in which case the delay results not only because of the time required for physical permeation but principally because of the time required for chemical reaction. A barrier timing layer is initially substantially impermeable and time is required to allow the aqueous alkaline solution to react with the layer and increase its permeability. Usually, the permeability-increasing reaction that takes place is the hydrolysis or neutralization of the layer by the alkaline solution. Typically, therefore, a barrier timing layer comprises a substantially alkaline solution-impermeable material which can be hydrolyzed or neutralized by the alkaline solution to a substantially alkaline solution-permeable material. Examples of barrier timing layers include layers of cellulose acetate phthalate, cellulose acetate and the like.

Preferred barrier timing layers for use in the film units of the present invention include those of U.S. Pat. Nos. 676,945 of Hannie and 676,947 of Hannie et al mentioned hereinabove. Hannie discloses barrier timing layers comprising polymeric latices having an activation energy of penetration by aqueous alkaling solution of greater than 18 kcal/mole. Hannie et al discloses barrier timing layers which comprise two adjacent barrier timing layers, one of which comprises a polymeric latex having an activation energy of penetration to aqueous alkaline solution of less than 18 kcal/mole and the second a polymeric latex like those disclosed by Hannie.

The activation energy of penetration of polymeric layers by aqueous alkaline solutions can be determined by the following simple test.

A thymolphthalein dye or cresol red dye indicator is coated on a poly(ethylene terephthalate) film support at 210 mg./m.$^2$ with 6.6 g./m.$^2$ gelatin in the case of thymolphthalein or 2.2 g./m.$^2$ in the case of cresol red.

A processing composition comprising a pod which contains about 0.84 N potassium hydroxide and about 5% carboxymethyl cellulose in water, along with other conventional developer ingredients, is spread between the element containing the indicator dye and a sample of a cover sheet by passing the "sandwich" between a pair of juxtaposed pressure rollers so that the developer layer thickness is 0.1 mm.

The cover sheet comprises a polyethylene terephthalate support containing a first layer of a 30/70 (by weight) copolymer of poly(butyl acrylate-co-acrylic acid), a second layer of 50/50 (mole ratio) polymer of poly(styrene-co-maleic anhydride) at 2.2 g./m.$^2$ and the outer layer being the polymer for which the activation energy is to be determined.

The time required to reduce the pH of a unit to pH 10 as measured by the color change of the thymolphthalein dye from blue to colorless, or to pH 8 as measured by the change of the cresol red dye from red to yellow, is measured at various temperatures within the range of 13° to 54° C. The time in seconds is plotted on a logarithmic scale against the reciprocal of the temperature expressed in ° K. The activation energy in kcal/mole is determined from the slope of the straight-line portion of the curve according to the formula:

$$E_a \text{(activation energy)} = 0.00458 \times \frac{\log Y_2/Y_1}{1/T_2 - 1/T_1}$$

where $T_2$ is the higher temperature and $T_1$ is the lower temperature and $Y_2$ is the time at $T_2$ and $Y_1$ is the time at $T_1$. The thickness of the acid layer and the polymer layer is not critical to the proper determination of activation energy.

A discussion of activation energy calculations can be found in *Kinetics and Mechanism*, second edition, N.Y., John Wiley and Sons, 1961, pp. 22–25.

Examples of polymers having an activation energy of less than 18 kcal/mole are mixtures of cellulose acetate and a maleic anhydride copolymer like those described in U.S. Application Ser. No. 521,221 of Abel filed Nov. 5, 1974 now U.S. Pat. No. 4,009,030, including poly(styrene-co-maleic anhydride), poly(ethylene-co-maleic anhydride), poly(methyl vinyl ether-co-maleic anhydride) and the like.

The maleic anhydride copolymer should be employed in a concentration of about 2 to about 20% by weight, depending somewhat on the other comonomer. A 5–20% concentration has been found to be particularly effective. The thickness of the barrier timing layer should be such to provide a coverage of about 5 g./m.$^2$.

The cellulose acetate employed will usually have acetyl contents of about 37–40% by weight, the 37% being substantially more permeable than the 40% acetyl. Mixed esters can also be employed, such as cellulose acetate propionate, cellulose acetate butyrate, etc.

A portion of the anhydride of the maleic anhydride copolymer used may also be hydrolyzed to the corresponding acid prior to use. For example, poly(styrene-co-maleic anhydride) was analyzed and found to contain 8 mole percent maleic anhydride, 7 mole percent monomethyl maleate, 26 mole percent maleic acid and 59 mole percent styrene. It is seen, therefore, that the mole percent of maleic anhydride in the copolymer can vary over a wide range, with about 30% to about 50% generally providing good results.

Examples of other layers containing polymers having an activation energy of less than 18 kcal/mole are poly(vinyl acetate), cellulose acetate phthalate, partial acetals of poly(vinyl alcohol), a polymer latex of butyl acrylate-diacetone acrylamide-styrene-methacrylic acid (60/30/4/6) as described in U.S. Pat. No. 3,785,815, mixtures of poly(vinyl acetate) and poly(vinyl alcohol) such as poly(vinyl acetate) latex in 78/22 ratio with poly(vinyl alcohol), cellulose acetate (40% acetate) in 95/5 ratio with poly(styrene-co-maleic anhydride) (50/50 mole ratio) as described in U.S. Application Ser. No. 521,221, and the like.

Preferred polymeric latices having an activation energy of penetration to aqueous alkaline solution of greater than 18 kcal/mole are terpolymers of from about 5 to about 35 percent by weight of polymerized ethylenically unsaturated monomer, from about 2 to about 10 percent by weight of polymerized ethylenically unsaturated carboxylic acid, and from about 55 to about 85 percent by weight of polymerized vinylidene chloride.

Any ethylenically unsaturated monomer which is different from the other monomers in the polymeric latex can be used to prepare the terpolymer, including alkyl acrylates and methacrylates such as methyl acrylate, ethyl acrylate, propyl acrylate, butyl acrylate, butyl methacrylate and the like; vinyl esters, amides, nitriles, ketones, halides, ethers, olefins, diolefins and the like as exemplified by acrylonitrile, methacrylonitrile, styrene α-methyl styrene, acrylamide, methacrylamide, vinyl chloride, methyl vinyl ketone, fumaric, maleic and itaconic esters, 2-chloroethyl vinyl ether, dimethylaminoethyl methacrylate, 2-hydroxyethyl methacrylate, N-vinylsuccinimide, N-vinylphthalimide, N-vinylpyrrolidone, butadiene, ethylene and the like. Preferred monomers are methyl acrylate and acrylonitrile.

Examples of ethylenically unsaturated carboxylic acids which can be included in the polymer include acrylic acid, methacrylic acid, itaconic acid, fumaric acid, maleic acid, their anhydrides, and the like. The preferred carboxylic acids are acrylic acid and itaconic acid.

The latex polymers can be prepared by polymerizing the monomers in water. For example, a terpolymer comprising 15 weight percent acrylonitrile, 80 weight percent of vinylidene chloride and 5 weight percent of acrylic acid can be prepared by charging into a reactor 4.5 g. of potassium persulfate dissolved in water, stirring, cooling to 20° C. and purging with nitrogen and adding 257 g. of acrylonitrile, 1453 g. of vinylidene chloride, 90 g. of acrylic acid and 450 g. of surfactant. To this is added a solution of 2.25 g. of potassium peroxydisulfate or persulfate in water and the reaction is continued at 30° C. and 150 revolutions per minute stirring.

A wide variety of surfactants can be used to coat the latex. For example, the addition to the latex before coating of up to 4% by weight of surfactants such as Triton X-100 (believed to be p-octylphenoxypolyethoxyethanol) or solvents such as methyl cellosolve may aid in the coating uniformity of the latex.

Another preferred terpolymer comprising 15 weight percent methyl acrylate, 83 weight percent vinylidene chloride and 2 weight percent itaconic acid is prepared by generally the same method as described above.

Further examples of latex polymers useful herein can be found in U.S. Pat. Nos. 3,271,345, 2,627,088, 2,491,023, 2,779,684, 3,437,484, 2,943,937 and 3,143,421.

In a number of embodiments, it is advantageous to affix various film-unit components to the cover sheet. For example, it may be advantageous to affix so-called spacer rail substrates between cover sheets and photosensitive elements so as to define more precisely the space between the cover sheet and the image-generating element into which the alkaline processing composition is discharged. Spacer rail substrates can be made of paper, various polymers such as poly(ethylene terephthalate), subbed or unsubbed, and the like.

Bonding of layers with the adhesive compositions described herein can be accomplished with heat or dielectric means or a combination of the two. Heat can be applied with devices having heated plates, rollers, drum or jaws. Bonding temperatures and pressures are usually less than 120° C. and 1500 mmHg. Bonds can be made with dielectric-hot jaw sealing devices at energy levels of from about 170 to about 200 volts and from about 80 to about 100 mega-hertz with the heated jaw at from about 20° to about 80° C. Sealing times vary from about 0.2 to about 0.6 second. Jaw pressure can vary from about 800 to about 2200 mmHg.

The photosensitive element useful in this invention can be treated with an alkaline processing composition to effect or initiate development in any manner. A preferred method for applying processing composition is by use of a rupturable container or pod which contains the composition. In general, the processing composition employed in this invention contains the developing agent for development, although the composition could also be just an alkaline solution where the developer is incorporated inthe photosensitive element, in which case the alkaline solution serves to activate the incorporated developer.

The dye image-providing materials which may be employed in this invention generally may be characterized as either (1) initially soluble or diffusible in the processing composition but selectively rendered nondiffusible in an imagewise pattern as a function of development, such as those disclosed, for example, in U.S. Pat. NOs. 2,647,049, 2,661,293, 2,698,244, 2,698,798, 2,802,735, 2,774,668 and 2,983,606, or (2) initially insoluble or nondiffusible in the processing composition but providing a diffusible image dye-providing material as a function of development, such as those disclosed, for example, in U.S. Pat. Nos. 3,227,550, 3,227,551, 3,227,552, 3,227,554, 3,243,294 and 3,445,228. These materials may contain preformed dyes or dye precursors, e.g., color couplers, oxichromic compounds and the like.

In a preferred embodiment of this invention, the dye image-providing material is a ballasted redox dye releaser. Such compounds are, generally speaking, compounds which can be oxidized, i.e., crossoxidized by an oxidized developing agent, to provide a species which as a functon of oxidation will release a diffusible dye, such as by alkaline hydroysis. Such redox dye releasers are described in U.S. Pat. Nos. 3,725,062 by Anderson and Lum issued Apr. 3, 1973, 3,698,987 by Gompf and Lum issued Oct. 17, 1972, 3,628,952 by Puschel et al issued Dec. 21, 1971, 3,443,939 by Bloom et al issud May 13, 1969, and 3,443,940 by Bloom et al issued May 13, 1969, and the following copending applications: Ser. Nos. 351,673 of Fleckenstein et al, published Jan. 28, 1975, and 351,700 of Fleckenstein, both filed Apr. 16, 1973 now U.S. Pat. Nos. 3,928,312; 331,727 and 331,729 of Landholm et al, both filed Feb. 12, 1973 both now abandoned; 331,728 of Haase et al filed Feb. 12, 1973 now abandoned; and 326,628 of Hinshaw et al filed Jan. 26, 1973 now abandoned; the disclosures of which are hereby incorporated by reference.

The term "nondiffusible" as used throughout the specification is intended to mean that the material will not substantially diffuse either within or from the layer in which it is located within the photographic element. In most instances, the materials are ballasted so as to render them nondiffusible. Likewise, the term "diffusible" is intended to mean that the material will substantially migrate from its layer in the photographic element in the presence of an alkali solution having a high pH such as 11 or greater to the image-receiving layer where it is mordanted.

In one preferred embodiment of this invention, the redox dye releasers in the Fleckenstein et al Application Ser. No. 351,673 referred to above are employed. Such compounds are nondiffusible sulfonamido compounds which are alkali-cleavable upon oxidation to release a diffusible sulfonamido dye. In certain preferred embodiments, the compounds have the formula:

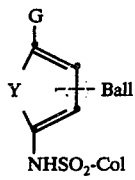

wherein:
(1) Col is dye or dye precursor moiety;
(2) Ballast is an organic ballasting group (preferably containing at least 8 carbon atoms) which renders said compound nondiffusible in a photographic element during processing of said element with an alkaline composition;
(3) Y represents the carbon atoms necessary to complete a benzene, naphthalene or heterocyclic nucleus; and
(4) G is OR or $NHR_1$ wherein R is hydrogen or a hydrolyzable moiety and $R_1$ is hydrogen or a substituted or unsubstituted alkyl group of 1 to 22 carbon atoms, such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, docosyl, benzyl, phenethyl, etc. (when $R_1$ is an alkyl group of greater than 6 carbon atoms, it can serve as a partial or sole ballast group).

For further details concerning the above-described sulfonamido compounds and specific examples of same, reference is made to the above-mentioned Fleckenstein et al Application Ser. No. 351,673 and Belgian Pat. No. 799,268 issued Feb. 28, 1972, the disclosures of which are hereby incorporated by reference.

In another embodiment of this invention, initially diffusible dye image-providing materials are employed such as dye developers, including metal complexed dye developers such as those described in U.S. Pat. Nos. 3,453,107, 3,544,545, 3,551,406, 3,563,739, 3,597,200 and 3,705 184, and oxichromic developers as described and claimed in U.S. Pat. No. 3,880,658 by Lestina and Bush issued Apr. 29, 1975, the disclosures of which are hereby incorporated by reference. When oxichromic developers are employed, the image is formed by the diffusion of the oxichromic developer to the dye image-receiving layer where it undergoes chromogenic oxidation to form an image dye.

The film unit of the present invention may be used to produce positive images in single- or multi-colors, as well as in black and white. In a three-color system, each silver halide emulsion layer of the film assembly will have associated therewith a dye image-providing material capable of providing a dye having a predominant spectral absorption within the region of the visible spectrum to which said silver halide emulsion is sensitive; i.e., the blue-sensitive silver halide emulsion layer will have a yellow dye image-providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion layer itself or in a layer contiguous the silver halide emulsion layer.

The concentration of the dye image-providing materials that are employed in the present invention may be varied over a wide range, depending upon the particular compound employed and the results which are desired. For example, the dye image-providing compounds may be coated as dispersions in layers by using coating compositions containing a weight ratio between about 0.25 and about 4 of the dye image-providing compound to the hydrophilic film-forming natural material or synthetic polymer binder, such as gelatin, polyvinyl alcohol, etc., which is adapted to be permeated by aqueous alkaline processing composition.

Generally, most silver halide developing agents can be employed to develop the silver halide emulsions in the photographic elements of ths invention. The developer may be employed in the photosensitive element to be activated by the alkaline processing composition. Specific examples of developers which can be employed in this invention include:

hydroquinone
N-methylaminophenol
Phenidone (1-phenyl-3-pyrazolidinone)
Dimezone (1-phenyl-4,4-dimethyl-3-pyrazolidinone)
aminophenols
N-N-diethyl p-phenylenediamine
3-methyl-N,N-diethyl-p-phenylenediamine
N,N,N',N'-tetramethyl-p-phenylenediamine
4-hydroxymethyl-4-methyl-1-phenyl-3-pyrazolidinone
etc.

In using redox dye-releaser compounds in this invention, the production of diffusible dye images is produced as a function of development of the silver halide emulsions. If the silver halide emulsion employed forms a direct-positive silver image, such as a direct-reversal internal-image emulsion or a solarizing emulsion, which is developable in unexposed areas, a positive image can be obtained on the dye image-receiving layer when redox releasers are employed which release dye where oxidized. After exposure of the film unit, the alkaline processing composition permeates the various layers to initiate development in the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the redox dye-releaser compound, the oxidized form of which either releases directly or undergoes a base-catalyzed reaction to release the preformed dyes or the dye precursors imagewise as a function of the imagewise exposure of each of the silver halide emulsion layers. At least a portion of the imagewise distributions of diffusible dyes or dye precursors diffuse to the image-receiving layer to form a positive image of the original subject.

Internal-image silver halide emulsions useful in the above-described embodiment are direct-positive emulsions that form latent images predominantly inside the silver halide grains, as distinguished from silver halide grains that form latent images predominantly on the surface thereof. Such internal-image emulsions were described by Davey et al in U.S. Pat. No. 2,592,250 issued Apr. 8, 1952, and elsewhere in the literature. Other useful emulsions are described in U.S. Pat. Nos. 3,761,276, 3,761,266 and 3,761,267, all issued Sept. 25, 1973. Internal-image silver halide emulsions can be defined in terms of the increased maximum density obtained when developed to a negative silver image with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 sec., and developing for 3 min. at 20° C. in Developer A below ("internal-type" developer), have a maximum density at least 5 times the maximum density obtained when an equally exposed silver halide emulsion is developed for 4 min. at 20° C. in Developer B described below ("surface-type" developer). Preferably, the maximum density in Developer A is at least 0.5 density unit greater than the maximum density in Developer B.

| Developer A | |
|---|---|
| hydroquinone | 15 g. |
| monomethyl-p-aminophenol sulfate | 15 g. |
| sodium sulfite (desiccated) | 50 g. |
| potassium bromide | 10 g. |
| sodium hydroxide | 25 g. |
| sodium thiosulfate | 20 g. |
| water to make 1 liter | |

| Developer B | |
|---|---|
| p-hydroxyphenylglycine | 10 g. |
| sodium carbonate | 100 g. |
| water to make 1 liter | |

The internal-image silver halide emulsions when processed in the presence of fogging or nucleating agents provide direct-positive silver images. Such emulsions are particularly useful in the above-described embodiment. Suitable fogging agents include the hydrazines disclosed in U.S. Pat. Nos. 2,588,982 by Ives issued Mar. 11, 1952, and 2,563,785 issued Aug. 7, 1951; the hydrazides and hydrazones disclosed by Whitmore, U.S. Pat. No. 3,227,552 issued Jan. 4, 1966; hydrazone quaternary salts described in British Pat. No. 1,283,835 and U.S. Pat. No. 3,615,615; hydrazone-containing polymethine dyes described in U.S. Pat. No. 3,718,470 and the fogging agents disclosed in copending application Ser. Nos. 601,891 and 601,888 of Leone et al filed Aug. 6, 1975 both now abandoned, or mixtures thereof. The quantity of fogging agent employed can be widely varied depending upon the results desired. Generally, the concentration of fogging agent is from about 0.4 to about 8 g./mole of silver in the photosensitive layer in the photosensitive element or from about 0.1 to about 2 g./liter of developer if it is located in the developer. The fogging agents described in U.S. Pat. Nos. 3,615,615 and 3,718,470, however, are preferably used in concentrations of 50 to 400 mg./mole of silver in the photosensitive layer.

Typical useful direct-positive emulsions are disclosed in U.S. Pat. Nos. 3,227,552 by Whitmore issued Jan. 4, 1966, 3,761,276 by Evans issued Sept. 25, 1973, 3,761,267 by Gilman et al, 3,761,266 by Milton, 3,703,584 by Motter, and the like.

In other embodiments, the direct-positive emulsions can be emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well-known in the art and are disclosed, for example, in U.S. Pat. Nos. 3,367,778 by Berriman issued Feb. 6, 1968, and 3,501,305, 3,501,306 and 3,501,307 by Illingsworth, all issued Mar. 17, 1970.

In still other embodiments, the direct-positive emulsions can be of the type described by Mees and James, *The Theory of the Photographic Process*, published by MacMillan Co., New York, N.Y., 1966, pp. 149–167.

The various silver halide emulsion layers of a color-film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181, 2,643,886, 2,653,732, 2,723,051, 3,056,492, 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color photographic film unit according to this invention, each silver halide emulsion layer containing a dye image-providing material or having the dye image-providing material present in a contiguous layer may be separated from the other silver halide emulsion layers in the negative portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104, 3,043,692, 3,044,873, 3,061,428, 3,069,263, 3,069,264, 3,121,011 and 3,427,158.

Generally, except where noted otherwise, the silver halide emulsion layers in the invention comprise photosensitive silver halide dispersed in gelatin and are about 0.25 to 5 microns in thickness; the dye image-providing materials are dispersed in an aqueous alkaline solution-permeable polymeric binder, such as gelatin, as a separate layer about 0.25 to 5 microns in thickness; and the alkaline solution-permeable polymeric interlayers, e.g., gelatin, are about 0.25 to 5 microns in thickness. Of course, these thicknesses are approximate only and can be modified according to the product desired.

The alkaline solution-permeable light-reflective layer employed in certain embodiments of photographic film units of this invention can generally comprise any opacifier dispersed in a binder as long as it has the desired properties. Particularly desirable are white light-reflective layers because they would be esthetically pleasing backgrounds on which to view a transferred transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix, such as, for example, gelatin, poly(vinyl alcohol), and the like. Brightening agents such as the stilbenes, coumarins, triazines and oxazoles can also be added to the light-reflective layer, if desired. When it is desired to increase the opacifying capacity of the light-reflective layers, dark-colored opacifying agents, e.g., pH-indicator dyes, may be added to it, or carbon black, nigrosine dyes, etc., may be coated in a separate layer adjacent the light-reflective layer.

The neutralizing layer employed in this invention which becomes operative after permeation of the processing composition through the barrier timing layer will effect a reduction in the pH of the image layers from about 13 or 14 to at least 11 and preferably 5–8 within a short time after imbibition. For example, polymeric acids as disclosed in U.S. Pat. No. 3,362,819 or solid acids or metallic salts, e.g., zinc acetate, zinc sulfate, magnesium acetate, etc., as disclosed in U.S. Pat. No. 2,584,030 may be employed with good results. Such neutralizing or pH-lowering materials reduce the pH of the film unit after development to terminate development and reduce substantially further dye transfer and thus stabilize the dye image.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described by Minsk, U.S. Pat. No. 2,882,156 issued Apr. 14, 1959, and basic polymeric mordants such as described in U.S. Pat. Nos. 3,709,690, 3,625,694, 3,898,088 of Cohen et al issued Aug. 5, 1975, and 3,859,096 of Burness et al issued Jan. 7, 1975. Other mordants useful in this invention include poly(4-vinylpyridine), the 2-vinylpyridine polymer quaternized with methyl-p-toluenesulfonate, and similar compounds described by Sprague et al, U.S. Pat. No. 2,484,430 issued Oct. 11, 1949, and cetyltrimethylammonium bromide, etc. Effective mordanting compositions are also described in U.S. Pat. Nos. 3,271,148 by Whitmore and 3,271,147 by Bush, both issued Sept. 6, 1966, and 3,958,995 of Campbell et al issued May 25, 1976.

Other materials useful in the dye image-receiving layer include alkaline solution-permeable polymeric layers such as N-methoxymethyl poly(hexamethylene adipamide), partially hydrolyzed poly(vinyl acetate), and other materials of a similar nature. Generally, good results are obtained when the image-receiving layer, preferably alkaline solution-permeable, is transparent and about 2.5 to about 5 $\mu$ in thickness. This thickness, of course, can be modified depending upon the result desired. The image-receiving layer can also contain ultraviolet-absorbing materials to protect the mordanted dye images from fading due to ultraviolet light, and brightening agents such as the stilbenes, coumarins, triazines, oxazoles, dye stabilizers such as the chromanols, alkylphenols, etc.

The alkaline processing composition employed in this invention is the conventional aqueous solution of an alkaline material, e.g., sodium hydroxide, sodium carbonate or an amine such as diethylamine, preferably processing at a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cps. to about 200,000 cps. In certain embodiments of this invention, an opacifying agent, e.g., $TiO_2$, carbon black, indicator dyes, etc., may be added to the processing composition. In addition, ballasted indicator dyes and dye precursors may also be present in the photographic film unit as a separate layer on the exposure side of the photosensitive layers, the indicator dyes being preferably transparent during exposure and becoming colored or opaque after contact with alkali from the processing composition.

The support for the photographic elements of this invention can be any material as long as it does not deleteriously effect the phtoographic properties of the film unit and is dimensionally stable. Typical flexible sheet materials include cellulose nitrate film, cellulose acetate film, poly(vinyl acetal) film, polystyrene film, poly(ethylene terephthalate) film, polycarbonate film, poly-$\alpha$-olefins such as polyethylene and polypropylene film, and related films or resinous materials. The support is usually about 2 to 9 mils (50–225 $\mu$m) in thickness. Ultraviolet-absorbing materials may also be included in the supports or as a separate layer on the supports, if desired.

The properties of the adhesive compositions used to bond the film unit are particularly important, i.e., they must have an extremely good shelf life at about 25° C. and 40–60% relative humidity, be nonblocking as tested by ASTM D1146 at 38° C. and be nonphotoactive and produce seals of consistent quality. The particular polyester adhesives of this invention satisfy all of these critical requirements.

The adhesive compositions described herein are useful in laminated structures which are useful in a variety of applications including photographic cover sheets, sound-recording tape, plastic glazing material, protective coatings, etc.

Typically, laminated structures comprise a support or base material which can be woven fabrics of natural and/or synthetic fibers; fibrous nonwoven structures such as paper and cardboard; metal sheets such as aluminum and steel; blockplate such as finplate or steel; leather; wood, particularly plywood or composition board; polymers such as poly(ethylene terephthalate), polyethylene, poly(vinyl chloride), poly(vinylidene chloride) and the like; rubber and synthetic rubber; cellular structures such as cellular polystyrene and cellular cellulose acetate; woven and nonwoven sheets of glass fibers; masonry structures such as cement or cinder blocks; glass; etc. Preferred supports include polystyrene, cellulose acetate and poly(ethylene terephthalate).

The adhesive compositions disclosed herein are coated on supports in a concentration of from about 8 g. to about 24 g./m.$^2$ of support, bonding it to a suitable layer which may be the same as or different from the support material. Preferably, the adhesives are used to bond hydrophilic support materials to hydrophobic layers, such as poly(ethylene terephthalate) to cellulose acetate butyrate and the like.

Polyester adhesive layers in the laminated structure of the present invention can be applied to either support from a suitable organic solvent, as disclosed hereinabove, and the like by spraying, brushing, dipping or other coating techniques. Typically, the solvent is removed from the adhesive layer by drying so that this layer is in the form of a substantially homogeneous coating upon one or the other or both of the layers to be laminated together. Lamination can then be carried out conveniently in the conventional manner by applying heat and pressure to the composite structure, thereby softening the adhesive layer and producing a strong bond between the layer of support and the other layer. An alternative procedure involves forming preformed homogeneous thin films upon the surface from which they may be readily stripped, the cast films being poured from solvent solutions of the polymeric adhesive or from hot melts of the adhesive. After formation and solidification of the polyester adhesive layer in the form of thin films, these films may then be interspersed between as many layers as desired to form a composite which is laminated together by application of heat and pressure.

The polyester adhesives disclosed herein are also useful in nonsilver halide radiation-sensitive materials, such as mechanical image materials including lithographic and planographic printing plates, photoresists and the like; electrophotographic image materials; and thermal image materials. They may also be useful as toner material in electrophotographic applications.

The following preparations illustrate how the polyester adhesives of the present invention may be prepared.

Preparation 1: Preparation of
poly[oxydiethylene-co-2,2-dimethyl-1,3-propylene
(50:50) terephthalate]

A mixture of dimethyl terephthalate (97.0 g., 0.5 mole), diethylene glycol (45.6 g., 0.43 mole), 2,2-dimethyl-1,3-propanediol (31.2 g., 0.3 mole), zinc acetate dihydrate (60 mg.) and antimony trioxide (20 mg.) was heated with stirring under a slow stream of nitrogen at 200° C. for 2 hr. The temperature was then raised to 240° C. and stirring was continued for 2 hr. The mixture was then stirred at 260° C. for 1 hr. The polymerization was performed at 280° C./0.2 mm. for 2.5 hr. to give a light amber, amorphous polymer of inherent viscosity of 0.57 as measured in a mixture of phenol:-chlorobenzene (50:50) at a concentration of 0.25 g./100 ml. at 25° C. The glass transition temperature was 50° C.

Other polyester adhesives of the present invention which were prepared similar to the above polyester include the following in Table 1 with corresponding compositions, inherent viscosities and glass transition temperatures (Tg):

Table 1

| Preparation | Acid Component* | | Glycol Component* | | Inherent Viscosity | Tg (° C.) |
|---|---|---|---|---|---|---|
| | Acid | Mole % | Glycol | Mole % | | |
| 2 | B | 95 | 1 | 80 | 0.67 | 36 |
| | A | 5 | 3 | 20 | | |
| 3 | B | 95 | 1 | 60 | 0.77 | 50 |
| | A | 5 | 3 | 40 | | |
| 4 | B | 95 | 1 | 50 | 0.53 | 44 |
| | A | 5 | 3 | 50 | | |
| 5 | B | 99 | 1 | 50 | 0.55 | 50 |
| | A | 1 | 3 | 50 | | |
| 6 | B | 90 | 1 | 50 | 0.62 | 49 |
| | A | 10 | 3 | 50 | | |
| 7 | B | 98 | 1 | 50 | 0.46 | 44 |
| | C | 2 | 3 | 50 | | |
| 8 | B | 98 | 2 | 60 | 0.84 | 19 |
| | A | 2 | 3 | 40 | | |
| 9 | B | 98 | 2 | 50 | 0.79 | 22 |
| | A | 2 | 3 | 50 | | |
| 10 | B | 98 | 2 | 40 | 0.70 | 40 |
| | A | 2 | 3 | 60 | | |
| 11 | B | 97.5 | 3 | 50 | 0.37 | 63 |
| | A | 2.5 | 4 | 50 | | |
| 12 | B | 98 | 2 | 50 | 0.63 | 16 |
| | C | 2 | 3 | 50 | | |
| 13 | D | 100 | 1 | 50 | 0.64 | 36 |
| | | | 3 | 50 | | |
| 14 | E | 100 | 1 | 20 | 0.34 | 8 |
| | | | 3 | 80 | | |

*The acids and glycols used were the following:
A = pyromellitic dianhydride
B = terephthalic acid
C = 3,4:3',4'-benzophenonetetracarboxylic dianhydride
D = isophthalic acid
E = hexahydroterephthalic acid
1 = diethylene glycol
2 = triethylene glycol
3 = neopentyl glycol
4 = 2-butyl-2-ethyl-1,3-propandiol

EXAMPLE 1–3: BOND-STRENGTH COMPARISONS

This is a comparative example of bonding strengths, which are illustrated by peel strength tests, of adhesives of the present invention compared with adhesives outside the scope of the present invention.

The polyester adhesives were evaluated as adhesives by the following procedures.

Coatings of the polyesters were prepared for screening as heat-sealable adhesives as follows:

Five g. of the adhesive were dissolved in 25 ml. of methylene chloride. After solution was complete, the homogeneous solution was coated at a wet coating thickness of 4 mils on 2.5- or 4.0-mil poly(ethylene terephthalate). The coating was then dried for 2 hr. at 85° C. and heat-sealed under pressure to various substrates.

Equipment

The peel equipment consisted of a cylindrical test drum mounted on four Teflon nesting rollers. The drum was made of ceramic or metal and was surfaced with any desired material such as a sheet of cellulose acetate. It rotated freely on the rollers and was heated with an axially positioned 2000-watt, General Electric 2M/T3CL 230-250 v., quartz infrared lamp. This equipment was mounted on the moving crosshead of an Instron Tensile Testing Machine. The surface temperature of the drum was controlled by several means including a Cole-Parmer thermistor probe and a YSI Model 72 Proportional Temperature Controller. The temperature of the surface was measured by a thermocouple and was displayed by a Data Technology Corporation Millivolt Meter.

Peel Strips

The test strips which were peeled from the drum consisted of an adhesive coated on sheets of poly(ethylene terephthalate). The coatings were normally 0.5 mil or 1 mil thick. A strip ½ inch (1.27 cm.) wide and about 12 inches (30.5 cm.) long was cut from the sample after drying or cooling.

The Peel Test

In preparation for a peel experiment, the drum was heated to the desired temperature and a test strip was wrapped circumferentially around it with the adhesive side down on the drum. The bonding conditions used depended on the data that were sought, but in all cases a mechanically actuated, heated 1.5 Kg bonding roller was passed at 1 inch/min. (2.54 cm./min.) over the test strip. The goal was to achieve a defect-free bond of the adhesive to the drum.

One end of the test strip was then attached to the Instron load cell and the temperature was adjusted to the desired point. The test was carried out by traversing the crosshead of the Instron downward, at the desired rate, for a distance of about 1 inch (2.54 cm.). The drum rotated as the test strip was peeled from it so that the peel angle remained constant at 90° C.

The force required to peel the strip from the drum was recorded by a strip chart recorder which ran at 10 inches (25.4 cm.) per min. Thus, on completing a measurement at one temperature, one has a recording of force in grams vs. time. Rates of 12 inches/min. (30.5 cm./min.) and 0.1 inch/min. (0.254 cm./min.) at the bonding temperature and at 70° C. were used.

Shear failure temperature was also determined as a 1-inch-square (6.5 cm.$^2$) lap joint of subbed poly(ethylene terephthalate) bonded to cellulose acetate with the sample adhesive was heated in an oven at a programmed rate of 10° C. each 30 min. with a 200 g. weight attached in shear. Results are recorded in the following Table 2. The key to the table is as follows:

A = adhesive failure
C = cohesive failure
cpm = centimeter per minute

The following control polyesters were prepared using procedures similar to the method used in Preparation 1:

Control A — poly[oxydiethylene terephthalate ]
I.V. = 0.84, Tg = 30° C.
Control B — poly[oxydiethylene pyromellitate-co-terephthalate (5.95)]
I.V. = 0.59, Tg = 31° C.
Control C — poly[ethylene-co-oxydiethylene (25:75) terephthalate]
I.V. = 0.47, Tg = 32° C.
Control D — poly[diethylene glycol-co-glycerol (80:20) terephthalate]
I.V. = 0.41, Tg = 26° C.
Control E — poly[ethylene-co-oxydiethylene (80:20) hexahydroterephthalate-co-3,4:3',4'-benzophenonetetracarboxylate (98:2)]
I.V. = 0.80, Tg = −8° C.

Table 2

| Reference | Shear Failure Temp. ° C. | Bond Temp. ° C. | Peel Strength | | | |
|---|---|---|---|---|---|---|
| | | | 70° C. | | Bonding Temp. | |
| | | | 0.25 cpm | 30.5 cpm | 0.25 cpm | 30.5 cpm |
| Control A | — | 85 | 30 C | 370 C | 20 C | 150 C |
| Control B | — | 110 | 18 C | 330 C | — | 62 C |
| Control C | — | 100 | 70 C | 630 C | 30 C | 390 C |
| Control D | 50 | 100 | 3 C | 620 C | 2 C | 96 C |
| Control E | — | 100 (tacky) | 20 C | 170 C | — | — |
| Example 1(1)* | 100 | 100 | 1580 A | 820 A | 190 C | 1160 C |
| Example 2(4) | 80 | 90 | 220 A | 1480 C | 70 C | 450 C |
| Example 3(5) | — | 100 | 560 C | 660 A | 34 C | 460 c |

*Number in parentheses identifies the polyester by Preparation Number.

From Table 2, it is seen that polyesters outside the scope of the present invention exhibit undesirably low bonding strengths at elevated temperatures, such as at 70° C. and at the bonding temperatures. Further, some polyester adhesives such as Control E exhibit unwanted tackiness at elevated temperatures.

The polyesters of Examples 1–3, however, have high bonding strengths at elevated temperatures and are nontacky at those temperatures.

EXAMPLE 4: PREPARATION OF AN IMAGE-TRANSFER UNIT

A photographic image-transfer unit or element having a double timing layer as described in U.S. patent application Ser. No. 676,947 of Hannie et al filed Apr. 14, 1976, was prepared by the following procedure.

A 10% solution of poly[oxydiethylene:2,2-dimethyl-1,3-propylene (50:50) terephthalate] (polyester of Example 1) in methylene chloride was coated onto both sides of a piece of poly(ethylene terephthalate) film support at a coverage of 1.2 g./ft.$^2$ (12.96 g./m.$^2$). The resulting adhesive-coated support was cut to form a spacer rail substrate, i.e., a rectangular frame of poly(ethylene terephthalate) having adhesive on both sides.

The spacer rail substrate was ultrasonically laminated to he masking layer of an integral negative receiver element. The ultrasonic sealing apparatus caused the adhesive to melt under pressure. The integral negative receiver was prepared as described in U.S. Ser. No. 676,947 mentioned hereinabove, Example 1, and affixed at layer 12 described therein (the gelatin overcoat) to a mask of poly(ethylene terephthalate) having carbon therein and having a rupturable pod containing a processing composition for the completed photographic element attached thereto.

After cooling this assembly, the exposed surface of the spacer rail substrate was dielectrically sealed to the cover sheet by contacting the spacer rail substrate and the outermost timing layer of the cover sheet for 0.2 sec. at 90° C. and 40 p.s.i. (2070 mmHg) and cooling to form a completed photographic film unit.

This unit was stored at ambient conditions for 1 month. Other units prepared in similar fashion were incubated at temperatures ranging from 10° F. (−12°

C.) to 180° F. (82° C.). None of these units showed any delamination due to a failure of the adhesive.

Other film units were similarly prepared and then exposed to light and processed by passing them through pressure rollers to break the pods of processing solutions and to spread the solutions evenly within the spacer rails. High-quality images were obtained with each unit and no leakage of processing solution was evident as the adhesives held firmly.

EXAMPLE 5: PREPARATION OF AN IMAGE-TRANSFER UNIT

In this example, an image-transfer unit was prepared as in Example 4 except that the adhesive-coated spacer rail substrate was first "tacked" ultrasonically to the cover sheet at four points instead of along the edges of the sheet. Then the cover sheet, spacer rail substrate and mask were simultaneously laminated together dielectrically as in Example 4. No delamination occurred upon long-term storage, and a high-quality image was obtained after exposure to light and subsequent processing.

EXAMPLES 6-11: ADHESIVE STRENGTH WITH VARIOUS SUBSTRATES

This is a comparison of the adhesive strengths of adhesives of the present invention compared with several outside the scope of the invention.

The particular polyester adhesives were coated from methylene chloride solutions onto polyethylene terephthalate subbed with acrylonitrile-ainylidene chloride-acrylic acid terpolymer to give 0.5 mil dry thickness, cured at 65.6° C. for 30 min. to 1 hr., and heat-sealed to the various substrates (fully described in U.S. Ser. No. 676,947 of Hannie et al, Example 1) with a Sentinel Heat Sealer at 149° C. for 0.5 sec. at 20 p.s.i. (1040 mmHg).

The control polyesters are the following, prepared using procedures similar to the method of Preparation 1:

Control F — poly[oxydiethylene-co-4,4′-isopropylidenebis(phenyleneoxyethylene) 95:5 terephthalate]
I.V. = 0.57, Tg = 31° C.
Control G — poly[oxydiethylene-co-4,4′-isopropylidenebis(phenyleneoxyethylene) 90:10 terephthalate]
I.V. = 0.59, Tg = 41° C.
Control H — poly(oxydiethylene sebacate-co-pyromellitate 98:2)
I.V. = 1.33, Tg = 38° C.
Control I — poly[ethylenebis(oxyethylene) sebacate-co-pyromellitate 98:2]
I.V. = 0.43, Tg = 57° C.

The results of peel force strength for these adhesives are recorded in Table 3. The tests were performed in a manner similar to that described in Examples 1-3, on an Instron Tester at 12 in. (30.5 cm.) per min. crosshead speed at 20° C. The key to Table 3 is as follows:

F — photosensitive element failure
A — adhesive failure
C — cohesive failure
D — adhesive delaminated from coated substrate
T — adhesive transferred from coated substrate to adherent
E — polyethylene terephthalate support broke Table 3

| Reference | Peel Force Strength (g./inch) | | |
|---|---|---|---|
| | Photosensitive Element | Cover Sheet Inner Side | Cover Sheet Outer Side |
| Control F | 100 | 850 | 750 |
| G | 50 | 50 | 50 |
| H | 325A | 250A/T | 25A |
| I | 35C | 30C | 30C |
| Example 6 (2)* | 600F | 950E | 150 |
| 7 (3) | 580F | 340D | 10A |
| 8 (8) | 300F | 80A | 75A |
| 9 (9) | 300F | 160A | 120A |
| 10 (10) | 340F | 40A | 30A |
| 11 (12) | 275F | 285F | 375A |

*Preparation number in parentheses

These results show the advantages of using the polyester adhesives of the present invention over those outside the scope of this invention. For instance, Control F, though having high strength for cover-sheet (barrier timing layer) surfaces, has low strength when bonded to a photosensitive element. Control G has low strength for all substrates. Controls H and I have low strengths when bonded to cover sheets and have unacceptably low glass transition temperatures. Examples 6-11 show overall improvement in bonding strengths to all substrates, though some make better bonds to photosensitive elements than to cover sheets.

EXAMPLE 12: HIGH-TEMPERATURE STRENGTH COMPARISON

The adhesive strength of a composition of this invention was compared with the strength of the adhesive having the lowest crystallinity disclosed in U.S. Pat. No. 3,515,628 of Jackson, Jr., et al (Example 23). Adhesive strength was determined by typical peel force strength tests over a temperature range similar to the tests in Examples 1-3 described hereinabove. Table 4 gives the results of the tests, which clearly show that the adhesive of the present invention, namely, poly[oxydiethylene-co-2,2-dimethyl-1,3-propylene (50:50) pyromellitate-co-terephthalate (5:95)] (I.V. = 0.53, Tg = 44° C.), which was prepared similar to the polyester of Preparation 2, exhibits superior bonding strengths over a wide temperature range, and particularly at moderate to high temperatures of greater than about 40° C. The control polyester from the Jackson, Jr., et al patent was poly(butylene hexahydroterephthalate) (I.V. = 1.14, T. = −11° C.).

The adhesives were used to bond a "double" timing layer of the Hannie et al application described hereinabove to a poly(ethylene terephthalate) substrate.

Table 4

| Reference Polyester | Peel Force Strength (grams/inch) at 12 in./min.) | | | | | | |
|---|---|---|---|---|---|---|---|
| | 5° C. | 10° C. | 15° C. | 25° C. | 35° C. | 50° C. | 70° C. |
| Control | 1800A,E | 1290A,CS | 1440A,CS | 1500A,E | 1660A,E | 160C | 60C |

Table 4-continued

| Reference Polyester | Peel Force Strength (grams/inch) at 12 in./min. | | | | | | |
|---|---|---|---|---|---|---|---|
| | 5° C. | 10° C. | 15° C. | 25° C. | 35° C. | 50° C. | 70° C. |
| Example 12 | 140A,E | 82A,E | 90A,E | 420A,E | 900C | 1740C | 1960C |

A = adhesive failure
E = poly(ethylene terephthalate)
CS = cover sheet
C = cohesive failure The invention has been described in detail with particular reference to certain embodiments thereof, but it will be understood that variations and modifications can be effected within the spirit and scope of the invention.

We claim:

1. In a radiation-sensitive element comprising a support and having thereon at least one radiation-sensitive layer, the improvement wherein the element contains at least one layer containing an amorphous polyester adhesive having less than 1% crystallinity, capable of remaining amorphous at temperatures above about 20° C., soluble in halogenated solvents, having a glass transition temperature within the range of from about −30° C. to about +50° C., and comprising:
    (a) an acid component comprising at least one phthalic acid derivative and
    (b) a glycol component comprising:
        (i) from about 15 to about 85 mole percent of at least one linear aliphatic glycol having the structure HO—R—H wherein R is selected from the group consisting of:

and $+CH_2CH_2O+_n$ wherein $n$ is an integer of from 2 to 4; and
        (ii) from about 85 to about 15 mole percent of at least one branched aliphatic glycol having the structure:

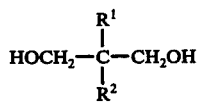

wherein $R^1$ and $R^2$ are alkyl.

2. The element of claim 1 wherein the radiation-sensitive layer is a silver halide emulsion layer.

3. The element of claim 1 wherein the adhesive has a peel force strength at 70° C. which exceeds about 200 grams per inch at a peel rate of 0.1 inch per minute.

4. The element of claim 1 wherein the polyester acid component is selected from the group consisting of terephthalic acid, isophthalic acid and hexahydroterephthalic acid.

5. The element of claim 1 wherein the polyester acid component is terephthalic acid and the polyester glycol component comprises from about 40 to about 60 mole percent of diethylene glycol and from about 60 to about 40 mole percent of neopentyl glycol.

6. The element of claim 1 wherein the polyester has an inherent viscosity within the range of from about 0.25 to about 1.25 in a 1:1 mixture of phenol and chlorobenzene at 25° C.

7. The element of claim 1 wherein the polyester concentration is within the range of from about 8 to about 24 grams per square meter of support.

8. In a photographic element comprising a support having thereon at least one light-sensitive silver halide emulsion layer, the improvement wherein the element contains at least one layer containing an amorphous polyester adhesive having less than 1% crystallinity, capable of remaining amorphous at temperatures above about 20° C., soluble in halogenated solvents, having a glass transition temperature within the range of from about −30° C. to about +50° C., and comprising:
    (a) an acid component comprising at least one phthalic acid derivative and
    (b) a glycol component comprising:
        (i) from about 15 to about 85 mole percent of at least one linear aliphatic glycol having the structure HO—R—H wherein R is selected from the group consisting of:

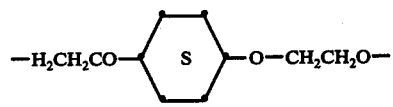

and $+CH_2CH_2O+_n$ wherein $n$ is an integer of from 2 to 4 and
        (ii) from about 85 to about 15 mole percent of at least one branched aliphatic glycol having the structure:

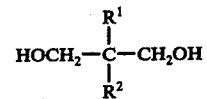

wherein $R^1$ and $R^2$ are alkyl.

9. In a photographic element comprising a support and having thereon at least one light-sensitive silver halide emulsion layer, the improvement wherein the element contains at least one layer containing an amorphous polyester adhesive having less than 1% crystallinity, capable of remaining amorphous at temperatures above about 20° C., soluble in halogenated solvents, having a glass transition temperature within the range of from about −30° C. to about +50° C., and comprising:
    (a) an acid component which is terephthalic acid and
    (b) a glycol component which comprises:
        (i) from about 40 to about 60 mole percent of diethylene glycol and
        (ii) from about 60 to about 40 mole percent of neopentyl glycol.

10. In a photographic film unit comprising:
    (a) a photosensitive element comprising a support having thereon at least one photosensitive silver halide emulsion layer having associated therewith a dye image-providing material;

(b) a dye image-receiving layer;
(c) means for discharging an alkaline processing composition within the film unit in contact with the photosensitive layer;
(d) a neutralizing layer for neutralizing the alkaline processing composition; and
(e) a barrier timing layer which is permeable by the alkaline processing composition after a predetermined time located between the neutralizing layer and the photosensitive silver halide emulsion;

the film unit containing a silver halide developing agent, the improvement wherein the film unit contains at least one layer containing an amorphous polyester adhesive having less than 1% crystallinity, capable of remaining amorphous at temperatures above about 20° C., soluble in halogenated solvents, having a glass transition temperature within the range of from about −30° C. to about +50° C. and comprising:

(a) an acid component comprising at least one phthalic acid derivative and
(b) a glycol component comprising:
(i) from about 15 to about 85 mole percent of at least one linear aliphatic glycol having the structure HO—R—H wherein R is selected from the group consisting of:

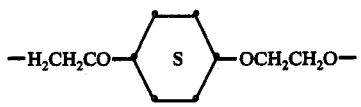

and $+CH_2CH_2O+_n$, wherein $n$ is an integer of from 2 to 4 and
(ii) from about 85 to about 15 mole percent of at least one branched aliphatic glycol having the structure:

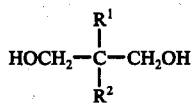

wherein $R^1$ and $R^2$ are alkyl.

11. The film unit of claim 10 wherein the polyester acid component is selected from the group consisting of terephthalic acid, isophthalic acid and hexahydroterephthalic acid.

12. The film unit of claim 10 wherein the polyester acid component is terephthalic acid and the polyester glycol component comprises from about 40 to about 60 mole percent of diethylene glycol and from about 60 to about 40 mole percent of neopentyl glycol.

13. The film unit of claim 10 wherein the adhesive has a peel force strength at 70° C. which exceeds about 200 grams per inch at a peel rate of 0.1 inch per minute.

14. The film unit of claim 10 wherein the polyester has an inherent viscosity within the range of from about 0.25 to about 1.25 in a 1:1 mixture of phenol and chlorobenzene at 25° C.

15. The film unit of claim 10 wherein the adhesive concentration is within the range of from about 8 to about 24 grams per square meter of support.

16. The film unit of claim 10 wherein the adhesive bonds the barrier timing layer to a spacer rail substrate which is located between the barrier timing layer and the outermost layer of the photosensitive element.

17. The film unit of claim 10 wherein the adhesive bonds the photosensitive element to a spacer rail substrate which is located between the barrier timing layer and the element.

18. The film unit of claim 10 wherein the image-receiving layer is located between the support and the silver halide emulsion layer, and the unit also includes a transparent cover sheet over the layer outermost from the support.

19. The film unit of claim 18 wherein the transparent cover sheet contains in order the neutralizing layer and the barrier timing layer.

20. The film unit of claim 18 wherein the discharging means is a rupturable container containing the alkaline processing composition and an opacifying agent, the container being so positioned during processing of the unit that a compressive force applied to the container will effect a discharge of the container's contents between the cover sheet and the outermost layer of the photographic element.

21. The image-transfer unit of claim 10 comprising:
(a) a photosensitive element comprising a transparent support having thereon the following layers in sequence: an image-receiving layer; an alkaline solution-permeable, light-reflective layer; an alkaline solution-permeable opaque layer; a red-sensitive silver halide emulsion layer having a ballasted redox cyan-dye releaser associated therewith; a green-sensitive silver halide emulsion layer having a ballasted redox magenta-dye releaser associated therewith; and a blue-sensitive silver halide emulsion layer having a ballasted redox yellow-dye releaser associated therewith;
(b) a cover sheet superposed over the blue-sensitive silver halide emulsion layer and comprising a transparent support coated with the neutralizing layer and the barrier timing layer; and
(c) a rupturable container containing the alkaline processing composition and an opacifying agent, the container being so positioned during processing of the unit that a compressive force applied to the container will effect a discharge of the container's contents between the cover sheet and the blue-sensitive silver halide emulsion layer.

22. The film unit of claim 21 wherein each redox dye releaser is a nondiffusible sulfonamido compound which is alkali-cleavable upon oxidation to release a diffusible sulfonamido color-providing moiety.

23. The film unit of claim 22 wherein each silver halide emulsion is a direct-positive silver halide emulsion.

24. The film unit of claim 10 wherein the dye image-receiving layer is located on one support and the photosensitive silver halide emulsion layer is located on another support.

25. In a photographic film unit comprising:
(a) a photosensitive element comprising a support having thereon at least one photosensitive silver halide emulsion layer having associated therewith a dye image-providing material;
(b) a dye image-receiving layer;
(c) means for discharging an alkaline processing composition within the film unit in contact with the photosensitive layer;
(d) a neutralizing layer for neutralizing the alkaline processing composition; and
(e) a barrier timing layer which is permeable by the alkaline processing composition after a predetermined time located between the neutralizing layer and the photosensitive silver halide emulsion;

the film unit containing a silver halide developing agent, the improvement wherein the film unit contains at least one layer containing an amorphous polyester adhesive having less than 1% in crystallinity, capable of remaining amorphous at temperatures above about 20° C., soluble in halogenated solvents, having a glass transition temperature within the range of from about −30° C. to about +50° C. and comprising:
(a) an acid component which is terephthalic acid and
(b) a glycol component comprising:
(i) from about 40 to about 60 mole percent of diethylene glycol and
(ii) from about 60 to about 40 mole percent neopentyl glycol.

26. In a photographic film unit comprising:
(a) a photosensitive element comprising a support having thereon at least one photosensitive silver halide emulsion layer having associated therewith a dye image-providing material;
(b) a dye image-receiving layer;
(c) means for discharging an alkaline processing composition within the film unit;
(d) a neutralizing layer for neutralizing the alkaline processing composition;
(e) a spacer rail substrate; and
(f) a barrier timing layer located between the spacer rail substrate and the neutralizing layer and which is permeable by the alkaline processing composition after a predetermined time;
the film containing a silver halide developing agent, the improvement wherein the film unit contains at least one layer containing an amorphous polyester adhesive having less than 1% crystallinity, capable of remaining amorphous at temperatures above about 20° C., soluble in halogenated solvents, having a glass transition temperature within the range of from about −30° C. to about +50° C. and comprising:
(a) an acid component comprising at least one phthalic acid derivative and
(b) a glycol component comprising:
(i) from about 15 to about 85 mole percent of at least one linear aliphatic glycol having the structure HO—R—H wherein R is selected from the group consisting of:

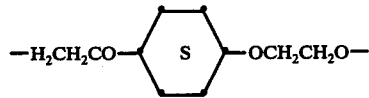

and +CH$_2$CH$_2$O+$_n$ wherein n is an integer of from 2 to 4 and
(ii) from about 85 to about 15 mole percent of at least one branched aliphatic glycol having the structure:

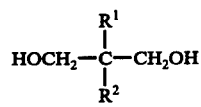

wherein R$^1$ and R$^2$ are alkyl.
27. The film unit of claim 26 wherein the polyester acid component is selected from the group consisting of terephthalic acid, isophthalic acid and hexahydroterephthalic acid.

28. The film unit of claim 26 wherein the polyester acid component is terephthalic acid and the polyester glycol component comprises from about 40 to about 60 mole percent of diethylene glycol and from about 60 to about 40 mole percent of neopentyl glycol.

29. The film unit of claim 26 wherein the polyester polyester has an inherent viscosity within the range of from about 0.25 to about 1.25 in a 1:1 mixture of phenol and chlorobenzene at 25° C.

30. The film unit of claim 26 wherein the adhesive concentration is within the range of from about 8 to about 24 grams per square meter of support.

31. The film unit of claim 26 wherein the adhesive has a peel force strength at 70° C. which exceeds about 200 grams per inch at a peel rate of 0.1 inch per minute.

32. The film unit of claim 26 wherein the adhesive bonds the barrier timing layer to the spacer rail substrate.

33. The film unit of claim 26 wherein the adhesive bonds the photosensitive element to the spacer rail substrate.

34. In a photographic film unit comprising:
(a) a photosensitive element comprising a support having thereon at least one photosensitive silver halide emulsion layer having associated therewith a dye image-providing material;
(b) a dye image-receiving layer;
(c) means for discharging an alkaline processing composition within the film unit;
(d) a neutralizing layer for neutralizing the alkaline processing composition;
(e) a spacer rail substrate; and
(f) a barrier timing layer located between the spacer rail substrate and the neutralizing layer and which is permeable by the alkaline processing composition after a predetermined time;
the film unit containing a silver halide developing agent, the improvement wherein the film unit contains at least one layer containing an amorphous adhesive having less than 1% crystallinity, capable of remaining amorphous at temperatures above about 20° C., soluble in halogenated solvents, having a glass transition temperature within the range of from about −30° C. to about +50° C., and comprising:
(a) an acid component which is terephthalic acid and
(b) a glycol component which comprises:
(i) from about 40 to about 60 mole percent of diethylene glycol and
(ii) from about 60 to about 40 mole percent of neopentyl glycol.

35. In a due image-receiving element comprising a support having thereon a neutralizing layer, a barrier timing layer and a dye image-receiving layer, the improvement wherein the element contains at least one layer containing an amorphous adhesive having less than 1% crystallinity capable of remaining amorphous at temperatures above about 20° C., soluble in halogenated solvents, having a glass transition temperature within the range of from about −30° C. to about +50° C., and comprising:
(a) an acid component comprising at least one phthalic acid derivative and
(b) a glycol component comprising:
(i) from about 15 to about 85 mole percent of at least one linear aliphatic glycol having the structure HO—R—H wherein R is selected from the group consisting of:

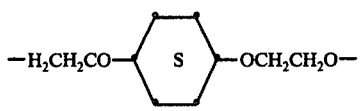

and $+CH_2CH_2O+_n$ wherein $n$ is an integer of from 2 to 4 and (ii) from about 85 to about 15 mole percent of at least one branched aliphatic glycol having the structure:

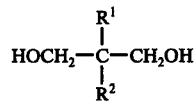

wherein $R^1$ and $R^2$ are alkyl.

36. In a cover sheet for use with a color diffusion transfer assemblage comprising a transparent support having thereon a neutralizing layer and a barrier timing layer, the improvement wherein the cover sheet contains at least one layer containing an amorphous adhesive having less than 1% crystallinity, capable of remaining amorphous at temperatures above about 20° C., soluble in halogenated solvents, having a glass transition temperature within the range of from about −30° C. to about +50° C., and comprising:

(a) an acid component comprising at least one phthalic acid derivative and
(b) a glycol component comprising:
 (i) from about 15 to about 85 mole percent of at least one linear aliphatic glycol having the structure HO—R—H wherein R is selected from the group consisting of:

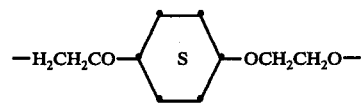

and $+CH_2CH_2O+_n$ wherein $n$ is an integer of from 2 to 4 and (ii) from about 85 to about 15 mole percent of at least one branched aliphatic glycol having the structure:

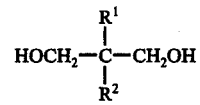

wherein $R^1$ and $R^2$ are alkyl.

* * * * *